United States Patent [19]

Kihara

[11] 4,223,458

[45] Sep. 23, 1980

[54] LAMINATED SHOE INSOLE

[75] Inventor: Sueo Kihara, Habikino, Japan

[73] Assignee: Kihara Sangyo Kabushiki Kaisha, Osaka, Japan

[21] Appl. No.: 25,689

[22] Filed: Mar. 30, 1979

[30] Foreign Application Priority Data

Mar. 31, 1978 [JP] Japan .................................. 53-36739

[51] Int. Cl.² .............................................. A43B 13/38
[52] U.S. Cl. ........................................ 36/44; 428/242; 428/244
[58] Field of Search ..................... 36/44, 43, 30 R, 26; 428/242, 244, 245, 246

[56] References Cited

U.S. PATENT DOCUMENTS

| | | | |
|---|---|---|---|
| 997,498 | 7/1911 | Headson | 428/242 |
| 3,852,897 | 12/1974 | Bridge et al. | 36/44 |
| 4,015,347 | 4/1977 | Morishita | 36/44 |
| 4,062,131 | 12/1977 | Hsiung | 36/44 |
| 4,099,342 | 7/1978 | Singh | 36/44 |
| 4,151,660 | 5/1979 | Yoshimi | 36/44 |

FOREIGN PATENT DOCUMENTS

982290 1/1951 France ........................................ 36/44
741875 12/1955 United Kingdom ..................... 428/242

*Primary Examiner*—James Kee Chi
*Attorney, Agent, or Firm*—Sughrue, Rothwell, Mion, Zinn and Macpeak

[57] ABSTRACT

A shoe insole comprising (A) a coarse mesh-like woven cloth backing made of monofilaments of a vinylidene chloride-type polymer, (B) a honeycomb-woven cloth intermediate layer made of monofilaments of the vinylidene chloride-type polymer, (S) a sheet prepared by coating a latex containing activated carbon powder, copper powder and magnetic powder on a non-woven cloth made of staple fibers of the vinylidene chloride-type polymer and/or a vinyl chloride-type polymer and heat-treating the coated cloth, and (D) a fine-woven cloth surface layer made of monofilaments of the vinylidene chloride-type polymer, the cloths (A), (B), (S) and (D) being laminated in order and the peripheral edge of the laminate being welded, and a process for producing the same.

5 Claims, 3 Drawing Figures

LAMINATED SHOE INSOLE

BACKGROUND OF THE INVENTION

1. Field of the Invention

This invention relates to a shoe insole which protects the user from athlete's foot, reduces foot fatigue and absorbs foot odor; and to a process for producing the same.

2. Description of the Prior Art

Japanese Patent Publication No. 48024/74 discloses a shoe insole composed of a coarse mesh-like woven cloth backing A made of monofilaments of a vinylidene chloride-type polymer, a honeycomb-woven cloth intermediate layer B made of monofilaments of the same vinylidene chloride-type polymer, and a fine-woven cloth surface layer D made of monofilaments of the same polymer. Cloths A, B and D are laminated in that order and welded at the peripheral edge of the laminate.

Japanese Patent Application No. 85653/77 discloses a deodorizing and mold-proofing shoe insole obtained by adhering spherical active carbon particles to a non-woven cloth made of staple fibers of a vinylidene chloride-type polymer coated with a latex containing a solution of a mold-proofing agent to form a sheet C in which the layer formed from the latex has an open-cellular structure, and laminating the coarse mesh-like cloth A, the honeycomb-woven cloth B, sheet C and the surface fine-woven cloth D in that order, and welding the peripheral edge of the resulting laminate. This deodorizing mold-proof insole, however, has the defects that the mold-proofing agent undergoes degradation and the thickness of the insole is too large due to the open-cellular structure of the latex layer which gives the insole a relatively large thickness.

SUMMARY OF THE INVENTION

It is an object of this invention to overcome the aforesaid defects, and to provide a shoe insole having the function of mold-proofing and deodorizing and which is magnetized to reduce the sole fatigue. According to this invention, a copper powder is used as a mold-proofing agent, and a magnetic powder, such as a ferrite, is used together with an activated carbon powder to radiate the lines of magnetic force.

The present invention provides a shoe insole composed of (A) a coarse mesh-like woven cloth as a backing made of monofilaments of a vinylidene chloride-type polymer, (B) a honeycomb-woven cloth intermediate layer made of monofilaments of the same vinylidene chloride-type polymer, (S) a sheet prepared by coating a latex containing activated carbon powder, copper powder and magnetic powder on a non-woven cloth made of staple fibers of the vinylidene chloride-type polymer and/or a vinyl chloride-type polymer and heat-treating the coated cloth, and (D) a fine-woven cloth surface layer made of monofilaments of vinylidene chloride-type polymer, said cloths (A), (B), (S) and (D) being laminated in that order, and welded at the peripheral edge.

DETAILED DESCRIPTION OF THE INVENTION

Figure 1:
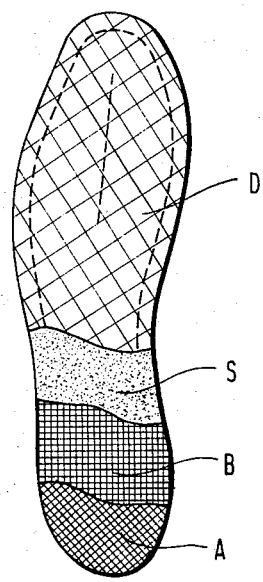
FIG. 1 is a top plan, partially removed, of the shoe insole of this invention.
Figure 2:
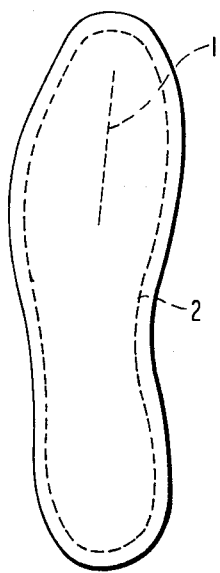
FIG. 2 is a top plan of one example of the shoe insole of the present invention.

The insole of this invention is a mold-proof, magnetized, deodorizing shoe insole which is obtained by coating a latex containing copper powder, magnetic powder (e.g., a ferrite) and activated carbon powder on a non-woven cloth composed of staple fibers of a vinylidene chloride-type polymer, e.g., vinylidene chloride-vinyl chloride copolymer, (the term "vinylidene chloride-type polymer" means a polymer containing vinylidene chloride as a main component and includes both homopolymer and copolymer) and/or staple fibers of a vinyl chloride-type polymer, e.g., vinyl chloride homopolymer, (the term "vinyl chloride-type polymer" refers to both homopolymers and copolymers containing vinyl chloride as a main component) and heat-treating the coated cloth to form a sheet (S); laminating a backing (A), the intermediate cloth (B), sheet (S) and the surface cloth (D) in this order; welding the peripheral edge of the laminate as shown in FIG. 1, and then exposing the laminate to an electric field to magnetize it. Optionally a dotted weld line 1 substantially forming the center line of the insole and a dotted weld line 2 between the periphery and the center line of the insole, surrounding the center line as shown in FIG. 2 may be provided.

One method for producing the insole of this invention is described below with reference to FIG. 3. The coarse mesh-like woven cloth (A), the honeycomb-woven cloth (B), the sheet (S), about 0.5 to 1 mm thick, formed by coating the latex on the non-woven cloth and heat-treating the coated non-woven cloth, and the fine-woven surface cloth (D), each in the form of a long sheet, are laminated in this order. The laminate 5 is pulled intermittently by a pulling device (not shown) via a pair of rollers 10 along the top surface of a flat plate-like lower electrode 3. Between the laminate 5 and the lower electrode 3, an electrically insulating buffering material 4, a laminate of a paper sheet having a thickness of 0.1 to 0.5 mm and a polyester film having a thickness of 0.02 to 0.1 mm is conveyed via rollers 11 and 12, and a polyester film 6 having a thickness of 0.01 to 0.02 mm is superimposed on the top surface of the laminate 5 via rollers 13 and 14. Thus, the laminate 5, the electrically insulating buffering material 4 and the polyester film 6 are intermittently moved at the same speed. An upper electrode 7 whose peripheral portion is sharpened by inclining the inside surface of its projecting portions is caused to descend toward the lower electrode 3 to press the electrically insulating buffering material 4, the laminate 5 and the polyester film 6 between the two electrodes. A high frequency current is passed across the two electrodes to perform welding and cutting of the peripheral edge of the laminate at the same time, and then, after cutting and welding, the laminate is exposed to a magnetic field to magnetize it.

Figure 3:
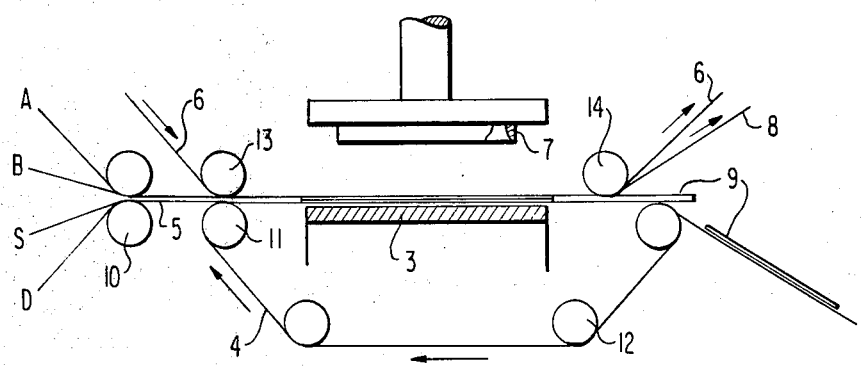
FIG. 3 is a schematic side view showing an apparatus for producing the shoe insole of this invention.

In FIG. 3, 8 is a refuse from the laminate 4 and 9 is a product before magnetization.

The first advantage of the mold-proof, magnetized deodorizing insole of the invention is that the copper powder is ionized in the presence of the moisture or sweat generated by the foot and the resulting copper ions exhibit a fungicidal action. Since this action lasts as long as the copper powder exists, no deterioration in the mold-proofing action occurs during the life time of the insole. Basically, any copper compound of any particle size can be used in the present invention as long as arcing does not occur during application of the electric field during manufacture.

The second advantage of the insole of this invention is that foot fatigue can be reduced by the stimulation produced by the lines of magnetic force produced by the magnetic ferrite. The ferrite powder used can be of any particle size as long as sparks are not generated (arcing does not occur) during the manufacture of the insole upon application of the electric field.

The third advantage is absorption of the offensive odors by the activated carbon.

One advantage of the process for producing the insole of this invention is that the welding and cutting are performed simultaneously. The simultaneous performance of welding and cutting reduces the cost of production. If welding alone is achieved without electrical discharge but cutting is performed separately, the process is time-consuming and the cost of production is increased. To perform the welding and cutting at the same time, the laminate 5 is placed between the electrically insulating buffering material 4 and the polyester film 6, and interposed between the two electrodes.

The latex is produced by mixing 100 parts by weight of a nitrobutyl rubber (NBR) latex, 0.5 to 1.5 parys by weight of sodium laurylsulfate, 0.5 to 1.5 parts by weight of sulfur, 0.5 to 1.5 parts by weight of zinc flower, 0.5 to 1.5 parts by weight of a vulcanization accelerator and 1 to 3 parts by weight of an antioxidant, and mixing the latex with a copper powder, a ferrite powder and an activated carbon powder to form a mixed latex. The mixed latex is coated on one or both surfaces of the non-woven cloth, and the coated cloth is heat-treated to form the sheet (S). Then, the back cloth (A), the intermediate cloth (B), the sheet (S) and the surface cloth (D) are laid one on top of the other to form the laminate 5. It is because of the unique structure laminate 5 of this invention that the insole can be welded and cut simultaneously. The mixed latex may be coated on both surfaces of the non-woven sheet, but coating only the one surface thereof suffices. The heat-treatment of the coated non-woven cloth can be performed by two steps, one for predrying and the other for crosslinking. The predrying step is usually carried out at a temperature of not more than 100° C., and the latter is carried out at a temperature of more than 100° C.

The activated carbon powder which is effectively used in this invention has a particle diameter of about 0.1 mm. Staple activated carbon fibers are also effective for use in the present invention. In the present invention, the latex layer does not need to have an open-cellular structure, and a non-cellular structure provides a thinner product with equivalent mold-proofing and deodorizing effects.

The suitable amounts of the activated carbon powder, the copper powder, and the magnetic powder are about 10 to 50 parts by weight, about 10 to 50 parts by weight, and about 100 to 400 parts by weight, respectively, per 100 parts by weight of the rubber latex. If the amounts are less than the specified lower limits, the mold-proofing, deodorizing and magnetizing abilities of the product are reduced. If the amounts are larger than the upper limits, the coating of the latex or the welding of the laminate became difficult.

The shoe insole of the present invention has air-permeability and superior mold-proofing, magnetizing and deodorizing properties. Since the welding and cutting of the laminate can be performed simultaneously, the process for producing the insole of this invention is very advantageous.

While the invention has been described in detail and with reference to specific embodiments thereof, it will be apparent to one skilled in the art that various changes and modifications can be made therein without departing from the spirit and scope thereof.

What is claimed is:

1. A shoe insole comprising (A) a coarse mesh-like woven cloth backing made of monofilaments of a vinylidene chloride-type polymer, (B) a honeycomb-woven cloth intermediate layer made of monofilaments of said vinylidene chloride-type polymer, (S) a sheet prepared by coating a latex containing activated carbon powder, copper powder and magnetic powder on a non-woven cloth made of staple fibers of said vinylidene chloride-type polymer and/or a vinyl chloride-type polymer and heat-treating the coated cloth, and (D) a fine-woven cloth surface layer made of monofilaments of said vinylidene chloride-type polymer, said cloths (A), (B), (S) and (D) being laminated in order and the peripheral edge of the laminate being welded.

2. The shoe insole of claim 1, wherein said activated carbon powder is present in an amount of about 10 to 50 parts by weight, said copper powder is present in an amount of about 10 to 50 parts by weight and said magnetic powder is present in an amount of about 100 to 400 parts by weight, respectively, per 100 parts by weight of the latex.

3. The shoe insole of claim 1, wherein said latex contains in addition of said copper powder, said activated carbon and said magnetic powder, 100 parts by weight of nitrobutyl rubber, 0.5 to 1.5 parts by weight of sodium laurylsulfate, 0.5 to 1.5 parts by weight of sulfur, 0.5 to 1.5 parts by weight of zinc oxide, 0.5 to 1.5 parts by weight of a vulcanization accelerator, and 1 to 3 parts by weight of an antioxidant.

4. The shoe insole of claim 1, wherein said laminate is dot welded at the center line of the insole.

5. The shoe insole of claim 4, wherein said insole is dot welded between the periphery and the center line of the insole.

* * * * *